United States Patent [19]
Gaymans et al.

[11] Patent Number: 5,510,451
[45] Date of Patent: Apr. 23, 1996

[54] COPOLYESTER AMIDES

[75] Inventors: Reinoud J. Gaymans, Enschede, Netherlands; Jeannette L. de Haan, Unterföhring, Germany

[73] Assignee: General Electric Company, Pittsfield, Mass.

[21] Appl. No.: 289,329

[22] Filed: Aug. 11, 1994

Related U.S. Application Data

[63] Continuation of Ser. No. 796,205, Nov. 22, 1991, abandoned.

[51] Int. Cl.⁶ .................................................. C08G 63/44
[52] U.S. Cl. ........................ 528/288; 528/271; 528/272; 528/292
[58] Field of Search ...................................... 528/271, 272, 528/288, 292

[56] References Cited

U.S. PATENT DOCUMENTS 2,856,385  10/1958  Van Den Berghe et al. .......... 528/292
2,925,405  2/1960  Laakso et al. ......................... 528/292

FOREIGN PATENT DOCUMENTS 0315027  10/1988  European Pat. Off. ..

*Primary Examiner*—James J. Seidleck
*Assistant Examiner*—Terressa Mosley

[57] ABSTRACT

The invention deals with copolyester amides built up from units derived from terephthalic acid, 1,4-butane-diol and 1,4-butane diamine.

8 Claims, 6 Drawing Sheets

COPOLYESTER AMIDES

This is a continuation of Ser. No. 07/796,205 filed on Nov. 22, 1991, now abandoned.

General Electric Company of Schenectady, N.Y., United States of America

Applicants mention as the inventors: Reinoud J. GAYMANS and Jeannette L. DE HAAN The present invention relates to new copolyester amides based on units originating from terephthalic acid and derivatives thereof, from one or more polyols and from one or more diamines.

Polybutylene terephthalate (PBT) is a particularly interesting synthetic resin which is used in particular as a so-called 'engineering plastic'. Due to the structural regularity thereof it has a high crystallinity, which results in a high modulus at temperatures above the glass transition temperature. Moreover it has a rapid crystallization. However, a disadvantage of the said synthetic resin is that the melting temperature, as well as the glass transition temperature, are rather low.

It has already been suggested to prepare polyester amides based on terephthalic acid and derivatives thereof. The polyester amide which has been studied most is the polymer of terephthalic acid with 1,6-hexanediamine and 1,6-hexanediol (6NT6). This polyester amide has properties which are comparable to those of polyethylene terephthalate. However, the G-modulus of the polyester amide shows a sharp decline at temperatures above the glass transition point.

Williams et al, J.Pol.Sc., 1962, pp. 353–359 describe the preparation of polyester amides based on various diamines and diols. With regard to the polyester amides with short-chain diols, for example C3 and C4, it is noted that here cyclization and dimerization side reactions obviously play a part. Obviously, apart from the polyester amides based on 1,3-propanediamine, one has not succeeded in manufacturing polyester amides with lower diols.

It is the object of the present invention to provide a new polyester amide having a high molecular weight, based on substantially butanediol as a diol, which polyester amide shows no or substantially no decrease in melting-point with respect to the corresponding polyester, shows a high crystallization rate, while the mechanical properties above the glass transition temperature are also well maintained.

The invention relates to copolyester amides which are built up from units originating from 1,4-butanediol, 1,4-butanediamine and terephthalic acid of the formula —[NH—(CH2)4—NH—C(O)—R—C(O)]a—[O—(CH2)4—O—C(O)—R—C(O)]b wherein R is a paraphenylene radical and a/b is between 0.05 and 1, which copolyester amide has an inherent viscosity [$eta_{inh}$] exceeding 0.4, preferably exceeding 0.6.

Such polymers are new and have surprisingly good properties. In this connection it is to be noted that these polymers may not be referred to as homopolymers, such as the products by Williams et al. As a result of the molar ratio of diamine/diol deviating from 1, we have prepared true copolyester amides here. Although the inventors of the present invention have succeeded in manufacturing homopolyester amide based on 1,4-butanediol and 1,4-butanediamine, this in contrast with Williams et al, it has been found that such a product does not have good properties.

In contrast with what is usual in the copolymerisation of various components, no or substantially no drop in melting temperature occurs in the copolyester amides according to the present invention. On the contrary, in the copolyester amides which are to be preferred according to the invention, the melting temperature has been increased as compared with the corresponding polyesters having a comparable viscosity.

According to the invention the viscosity, i.e. the measure for the molecular weight [$eta_{inh}$] exceeds 0.4, preferably exceeds 0.6. The viscosity has been determined in phenol/tetrachloroethane (50/50 (mol)) using a 0.5% by weight solution. Optimum properties of the product are obtained with such viscosities of the copolyester amides according to the invention. More in particular, the mechanical properties, for example, impact strength, then are good. A viscosity of more than 5.0 has no special advantages. Moreover, very special measures have then to be taken for processing the product, so that this is not preferred.

It is particularly surprising that a product having a high molecular weight can be obtained exactly with this combination of starting products, since this is not possible with other combinations of starting products, notably diols having a small number of carbon atoms. Obviously the present combination is an exception hereto.

The copolyester amides according to the invention have a number of unexpected and special properties. First of all, the melting temperature has been increased with respect to the melting temperature of the corresponding polyesters, i.e. PBT. This is particularly surprising, since on the basis of the known data (Van den Berghe and Williams, U.S. Pat. No. 2,856,385), it might be expected that this would just be lower. The variation of the modulus at temperatures above the glass transition temperature is particularly favourable. In fact the modulus shows a considerably smaller decline than is usual, so that the temperature range within which the products according to the invention are useful, is much larger. This unexpected variation of the modulus applies both to dry and to wet products.

As a result of this, new ways are opened for a great number of new applications. Since a number of other properties are comparable to PBT, for example, rapid crystallization and extent of ordering in the solid state, the copolyester amides according to the invention constitute a class of polymers having a wide range of application. The resistance to solvent is particularly good, as well as the water absorption and the resistance to frictional detrition. The copolyester amide according to the invention may be used inter alia as an 'engineering plastic', or for the manufacture of fibres, for example, for technical yarns.

In itself, it is possible to manufacture the copolyester amides with a 'random' distribution of the units originating from diol and diamine. It has been found, however, that with a more ordered distribution of the units originating from the diamine, a considerably better pattern of properties is obtained. For that reason, it is to be preferred that the number of a-units i.e. units originating from diamine, which is present next to each other in the copolyester amide, is not more than 15% of the overall number of a-units.

The major components of the copolyesters according to the invention originate from 1,4-diaminobutane, 1,4-butanediol and terephthalic acid. However, it is also possible to replace a minor quantity of these components by corresponding components. It is essential, however, for these components not to adversely influence the properties of the copolyester amides. In general, not more than 10 mol. % of each component should be replaced by another component. More in particular this quantity is not more than 5 mol.%, preferably 0%.

The preparation of the copolyester amides according to the invention may be Carried out in various manners.

According to a first modified embodiment it is done in a number of steps. A diester diamide is prepared in a first step by reaction of a diamine with an at least twofold molar quantity of diester of terephthalic acid, for example, dimethyl terephthalate. This reaction is generally carried out in the presence of a catalyst, for example, Li(OCH3). The use of a catalyst is not necessary, but in general has a positive influence on the course of the reaction. If the reaction is carried out starting from a mixture of all components which are provided in the reactor prior to the beginning of the reaction, a rather large excess of diester (400%) should be used so as to obtain an optimum product. It has been found surprisingly that it is also possible to prepare the product with a high yield using a small excess of diester (150%). It is also possible to start from the diamine and p-carboalkoxy-benzoyl chloride.

A mixture of this diester diamide, a diol and optionally terephthalic acid or a terephthalic acid derivative is then condensed to form a prepolymer. This prepolymer may finally be postcondensed to form a copolyester amide having the desired properties.

The conditions for the preparation of copolyester amides known from literature may be used for the prepolymerisation, but it is to be preferred to perform the prepolymerisation at a temperature of <225° C., at a pressure of ≧0.75 bar, and to then keep the temperature at a value of ≧230° C., at a pressure of <0.1 bar for at least 20 minutes. More in particular this second phase may be carried out at a temperature between 230° and 300° C., at a pressure between 10 and 50 mbar, for 10–45 minutes, and then at a temperature of >230° C. at a pressure of <5 bar, for 45 to 120 minutes.

The prepolymer thus i obtained may optionally be postcondensed in the conventional manner in the solid state at a temperature between 175° C. and a few degrees below the melting-point of the polymer, in the presence of an inert gas.

Another method of preparing the copolyester amides according to the invention comprises adding together a diol, a diamine and a dialkyl terephthalate or terephtalic acid or a terephthalate derivative, succeeded by increasing the temperature of the mixture to a value between 150° and 200° C. In this manner a prepolymer having a reasonable ordering degree is obtained, which prepolymer may be postcondensed to the desired molecular weight. The advantage of this method is that it can be carried out in one reactor without intermediate isolation and/or purifications steps, which may have important practical advantages.

This second methods may still be adapted by bringing a mixture of the diol and the diester at the indicated reaction temperature and then gradually adding the diamine. In this manner the advantage of a one-reactor method is still present, while an excellent product is obtained.

By variation of the ratio diester, diol and terephthalic acid derivative, copolyester amides may be obtained with various ratios between ester and amide groups.

In the description hereinbefore, terephthalic acid or a derivative thereof is used as a starting material for the preparation of the copolyester amide. This includes in principle any terephthalic acid derivative which may be used for this purpose, notably the diesters of terephthalic acid having a splittable ester group, for example, a lower alkyl group(Cl-C4). In this connection it is noted finally that it is optionally possible to start from a terephthalic acid other than dicarboxylic acid, for example, 2,5-naphthalene dicarboxylic acid, provided the said dicarboxylic acid has the same structural properties in the copolyester amides according to the invention as terephthalic acid.

The copolyester amides according to the invention may be processed in any manner conventionally used for PBT to form articles, for example, by injection moulding at a temperature above the melting-point thereof. The usual additives may also be incorporated in the polymer, for example, dyes, pigments, UV-stabilisers, thermal stabilisers, as well as fillers, for example, soot, silicic acid, clay or glass fibres. It is also possible to mix the products according to the invention with one or more other synthetic resins.

The invention will now be described in greater detail with reference to a few specific examples which serve to illustrate the invention and not to limit same.

Examples

A number of products according to the invention was prepared by starting from a general method one embodiment of which will be described in greater detail hereinafter.

Preparation diester-diamide a1. 5 g (0.06 Mol) of 1,4-diaminobutane, 111 g (0.6 Mol) of dimethyl terephthalate (excess), 106 ml of dry methanol and 395 ml of dry toluene were combined in a 1 liter three-necked flask with nitrogen inlet, reflux cooler and top stirrer. 9.5 ml of 1.89M Li(OCH3) in methanol were added to this mixture. The mixture was refluxed (65°–70° C.) while stirring thoroughly. A white precipitate slowly formed in the initially bright solution after 1 hour. The mixture was kept at the reflux temperature for 40 hours, after which the precipitate was filtered off. The filtered product was then dispersed in boiling toluene and again filtered off (warm). This procedure was repeated. The product was then dispersed in boiling methanol, filtered warm and dried. The yield was 96–98%. The reaction product had a melting-point of 257° C. and a melting heat of 144 J/g.

a2. 35.9 g (0.408 Mol) of 1,4-diaminobutane, 400 g (2.041 Mol) of dimethyl terephthalate (excess), 425 ml of dry methanol and 1600ml of dry toluene were combined in a 4 liter three-necked flask with nitrogen inlet, reflux cooler and top stirrer. 20ml of 1.89M Li(OCH3) in methanol were added to this mixture. The mixture was refluxed (65°–70° C.) while stirring thoroughly. A white precipitate slowly formed after 1 hour in the initially bright solution. The mixture was maintained at the reflux temperature for 40 hours, after which the precipitate was filtered off. The filtered product was then dispersed in boiling toluene and again filtered off (warm). This procedure was repeated. The product was then dispersed in boiling methanol, filtered warm and dried. The yield was 88–93%. The properties were comparable with those of the product obtained according to a1.

Prepolymerisation and polymerisation.

b. 10.0 g Of the diester diamide according to a1 (24.3 mMol), 9.46 g of dimethyl terephthalate (48.7 mMol) 13.1 g of 1,4-butanediol and 0.4 ml of catalyst solution (1.48g of tetraisopropyltitanate and 0.1 g of Na in 30 ml of distilled n-butanol) were reacted at 180° C. for 30 minutes in a 250 ml-flask with nitrogen inlet and a mechanical stirrer.

c. The temperature was then raised to 250° C. and a vacuum of 10–15 mm Hg was applied for 30 minutes. The temperature was then further raised to 265° C. and the pressure was reduced to 0.1–0.01mm Hg. These conditions were maintained for 1 hour.

Postcondensation d. The material obtained sub c was ground and postcondensed in the solid state at a temperature of 220° C. under nitrogen for 24 hours.

The influence of the temperature and the reaction duration (t) during the first phase of the prepolymerisation (b) were examined. The results are recorded in the following Table 1. $eta_{inh}$ represents the inherent viscosity of a 0.25% solution in a (50/50 molt) mixture of phenol/$C_2 Cl_4 H_2$.

TABLE 1

| Experiment | T (°C.) | t (min) | P (mm Hg) | `eta $_{inh}$ (dl/g) |
|---|---|---|---|---|
| 1 | 200 | 45 | 0.1–0.01 | 0.69 |
| 2 | 180 | 45 | 0.03–0.01 | 0.83 |
| 3 | 180 | 30 | 0.05–0.01 | 0.91 |
| 4 | 180 | 30 | 0.05–0.01 | 0.74 |
| 5 | 180 | 20 | 0.02–0.01 | 0.85 |
| 6 | 180 | 20 | 0.02–0.01 | 0.78 |
| 7 | 170 | 30 | 0.03–0.01 | 0.78 |

The influence of the temperature on the postcondensation (24 hours) was determined while using the procedure described hereinbefore. The results are recorded in Table 2.

TABLE 2

| Experiment | T (°C.) | `eta $_{inh}$ (dl/g) |
|---|---|---|
| 8 | — | 0.83 |
| 8A | 220 | 1.29 |
| 8B | 230 | 1.03 |
| 9 | — | 0.85 |
| 9A | 200 | 1.23 |
| 9B | 210 | 1.13 |
| 9C | 220 | 1.30 |
| 10 | — | 0.94 |
| 10A | 230 | 1.19 |
| 10B | 240 | 1.13 |

By varying the mutual ratio of the reactants in the prepolymerisation, the content of ester amide groups in the polymer may be varied. Table 3 is a survey of the results of a number of these polymers. The reaction conditions are always kept the same (as described hereabove under b, c and d).

The obtained samplers were analysed in a Perkin-Elmer DSC-7 instrument with a heating and a cooling rate of 20° C. per minute. The samples are first heated to 20° C. above their melting point (10 minutes, isothermal), cooled to 30° C. and heated again. The area under the second melting curve is used as the heat of melting ($\Delta H_{m,2}$). In this way the crystallisation temperature ($T_c$), the melting temperature in a first heating/cooling cycle and in a second heating/cooling cycle ($T_{m,1}$ and Tm,2 respectively), have been determined. The temperature at which the loss modulus reached a maximum has been determined as the glass temperature (Tg) both for a dried sample (24 hours in a vacuum oven) and for a wet sample (24 hours suspended in boiling water).

The results are summarised in Table 3 herebelow.

TABLE 3

| No. | PEA (mol % amide) | `eta $_{inh}$ (dl/g) | Tc (°C.) | Tm,1 (°C.) | Tm,2 (°C.) | ΔHm,2 (J/g) | Tg* (°C.) | Tg** (°C.) |
|---|---|---|---|---|---|---|---|---|
| 11 | 0 | 1.66 | 190 | 223 | 222 | 43 | 47 | 40 |
| 12 | 10 | 1.32 | 201 | 232 | 232 | 53 | 59 | 40 |
| 13 | 20 | — | 216 | — | 244 | 44 | — | — |
| 14 | 25 | 1.19 | 236 | 264 | 261 | 41 | 78 | 48 |
| 15 | 30 | 0.51 | 227 | — | 268 | 47 | 85 | — |
| 16 | 35 | 0.31 | 255 | 289 | 286 | 27 | 88 | 48 |
| 17 | 40 | — | — | — | 316 | *** | — | 116 | 44 |
| 18 | 50 | 0.43§ | — | — | 382 | — | — | 110 | — |

— not determined
*glass temperature (G"max, dry)
**glass temperature (G"max, wet)
***product did not dissolve completely
§ 0.5% by weight solution in 96% H2SO4

A number of properties of the products according to the examples are summarised in FIGS. 1–6.

Figure 1:
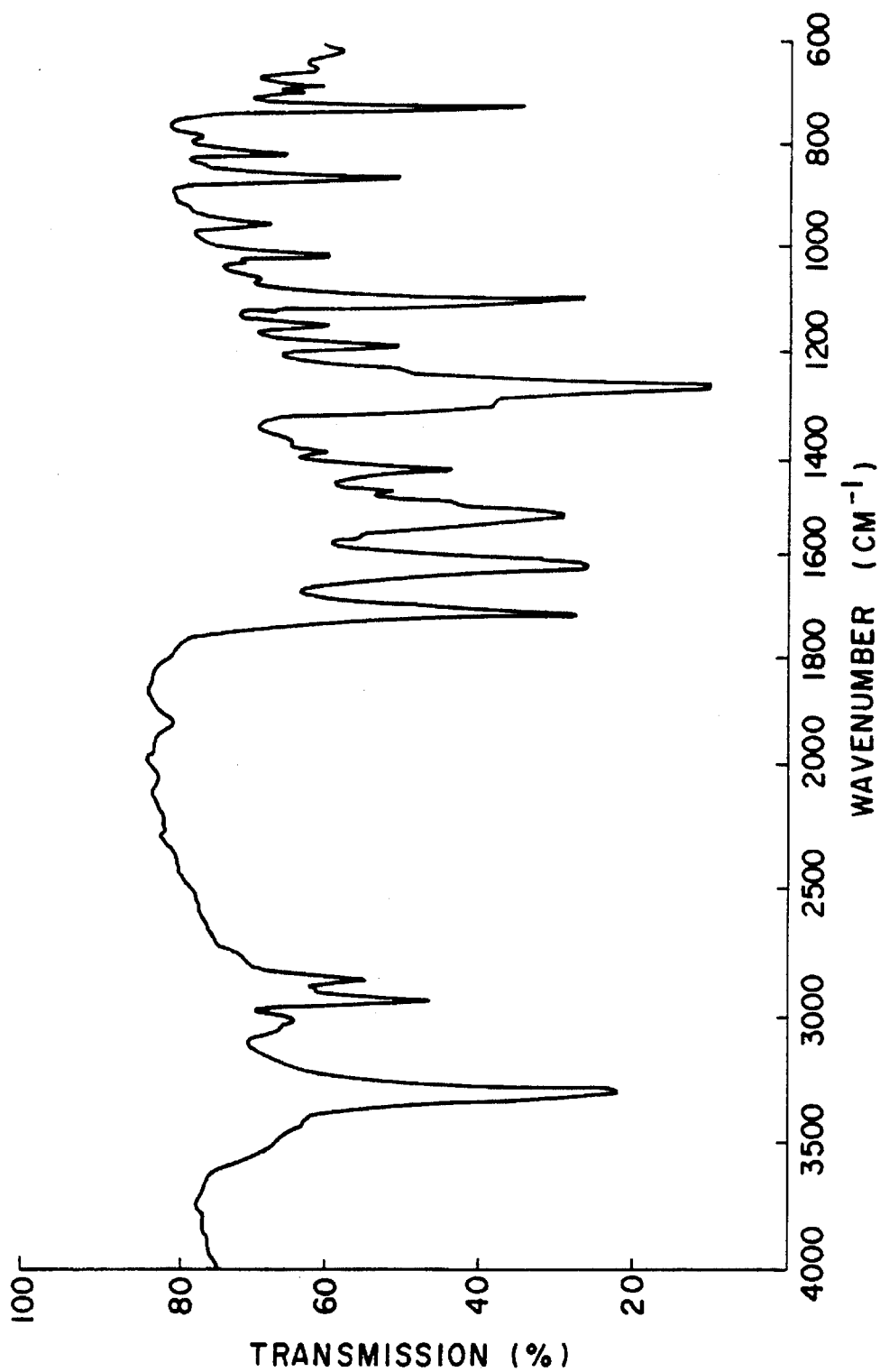
FIG. 1 shows an IR spectrum of the diester-diamide prepared according to a1.
Figure 2:
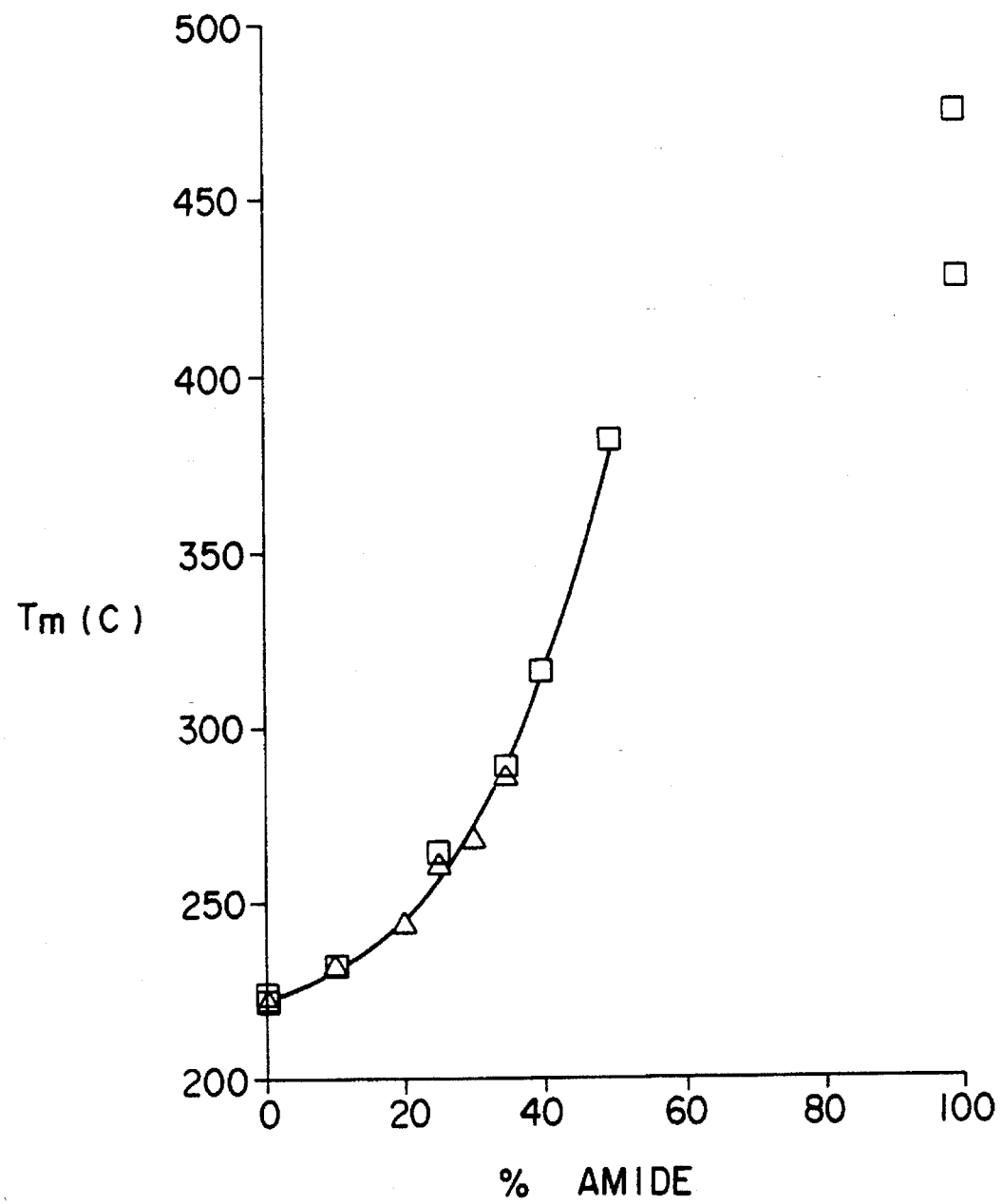
FIG. 2 is a graph in which the melting temperature is plotted against the content of amide groups.
Figure 3:
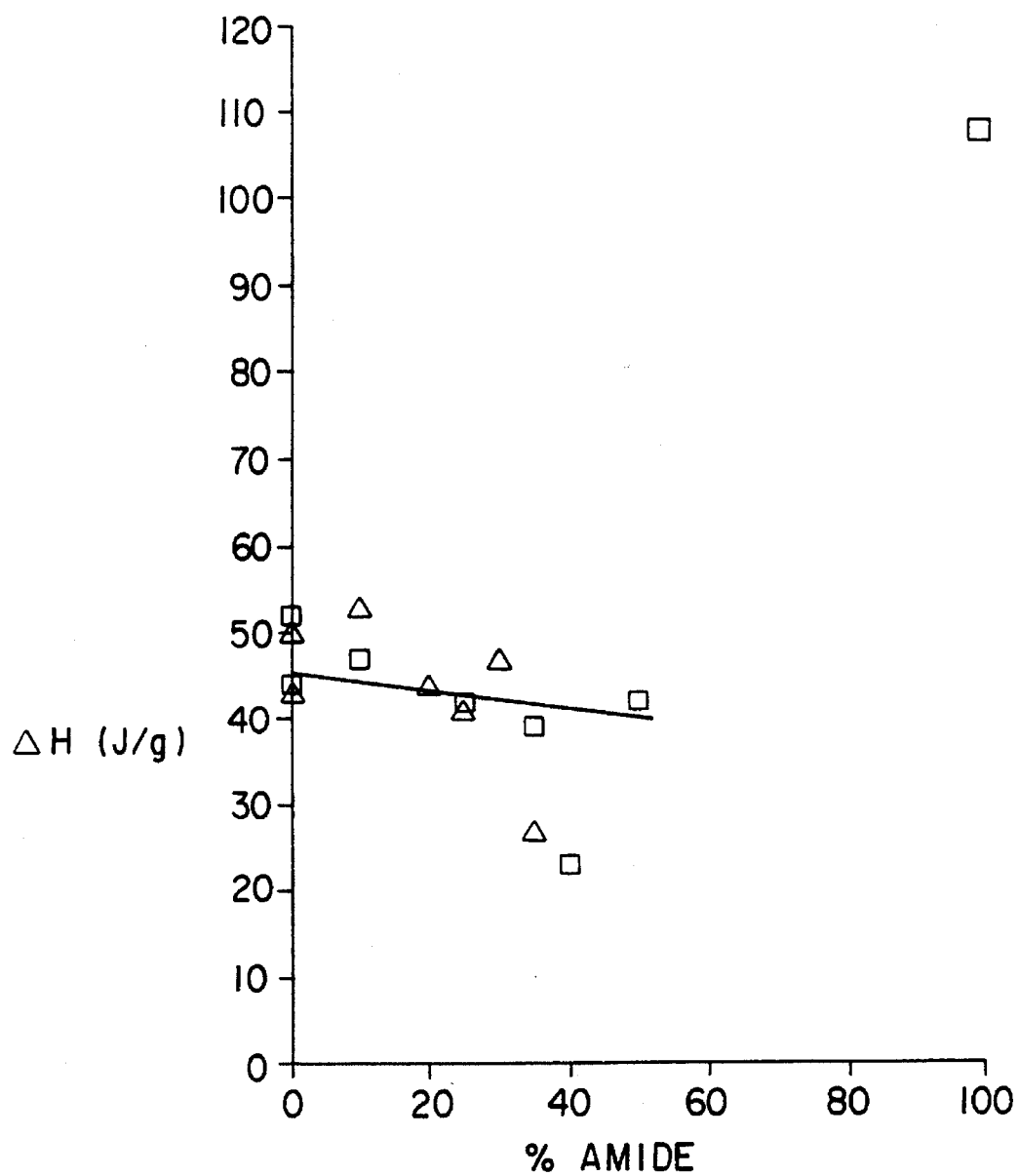
FIG. 3 is a graph in which the melting heat is plotted against the content of amide groups.
Figure 4:
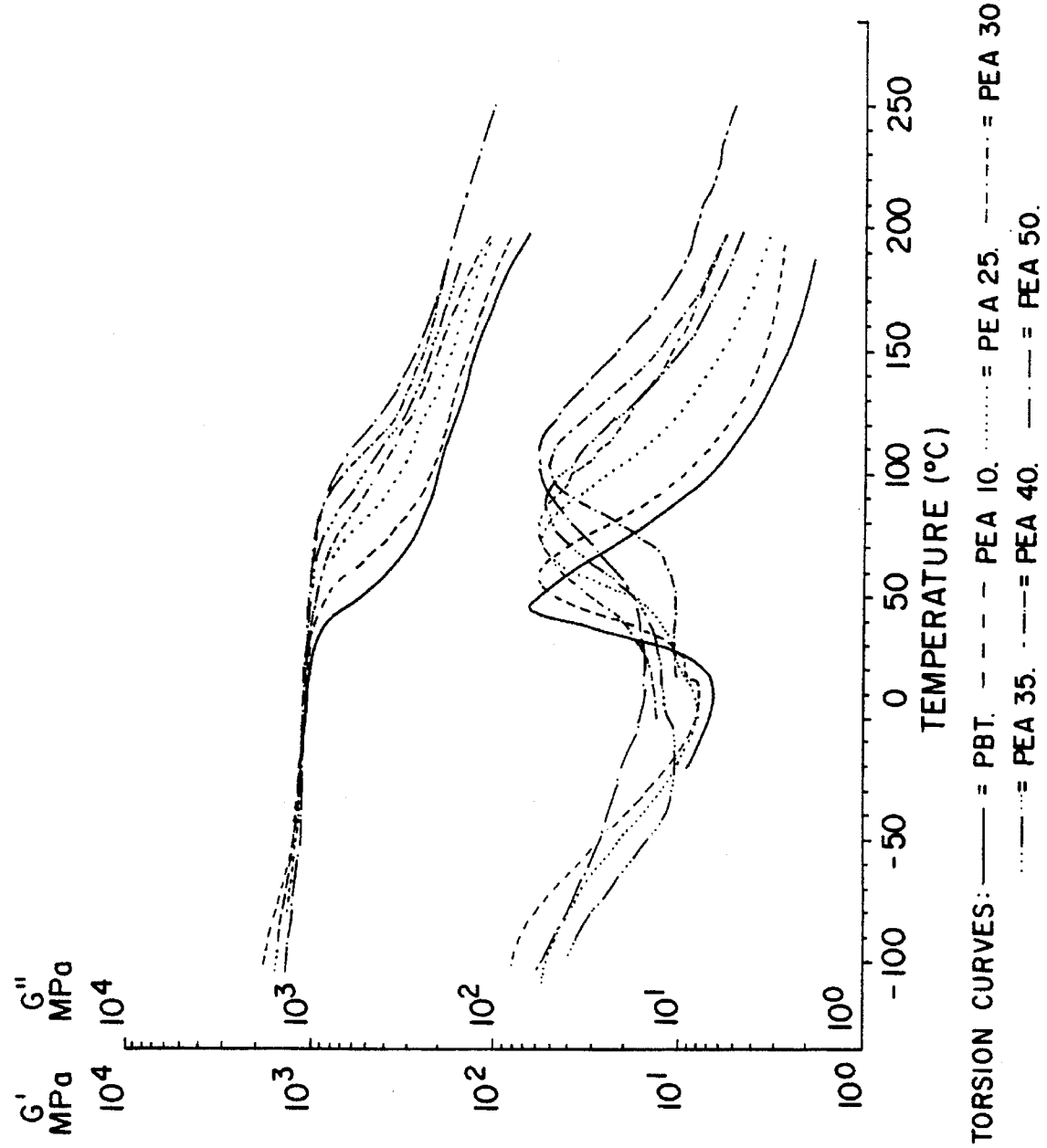
FIG. 4 shows the torsion diagrams of a number of products having a varying amide content varying from zero (PBT) to 50 mol % (PEA 50) (dry; 1 Hz; heating rate 1.8° C./min.).
Figure 5:
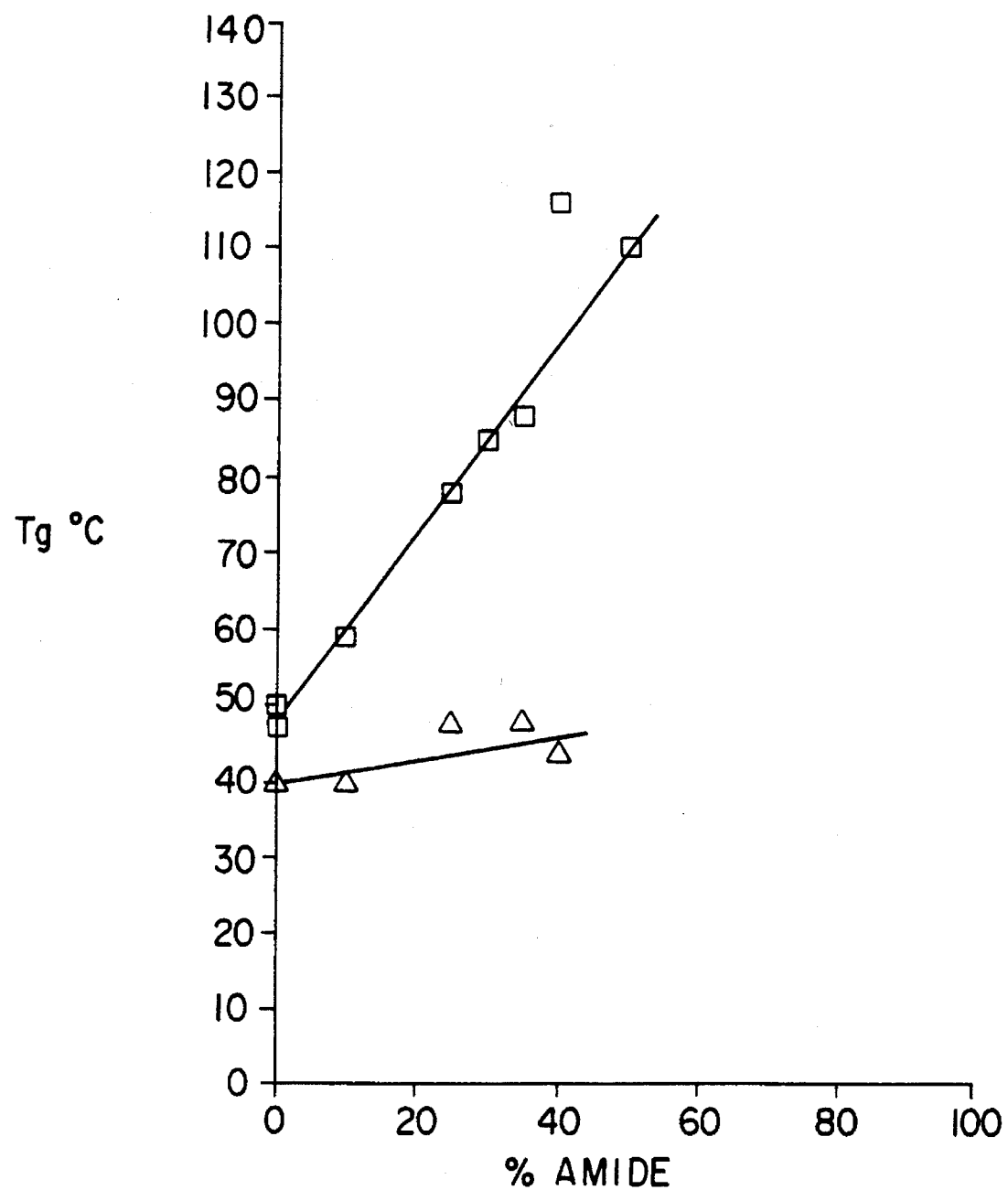
FIG. 5 shows the glass transition temperatures of a number of polymers (wet;, indicated by a square, and dry, indicated by a triangle), depending on the content of amide groups.
Figure 6:
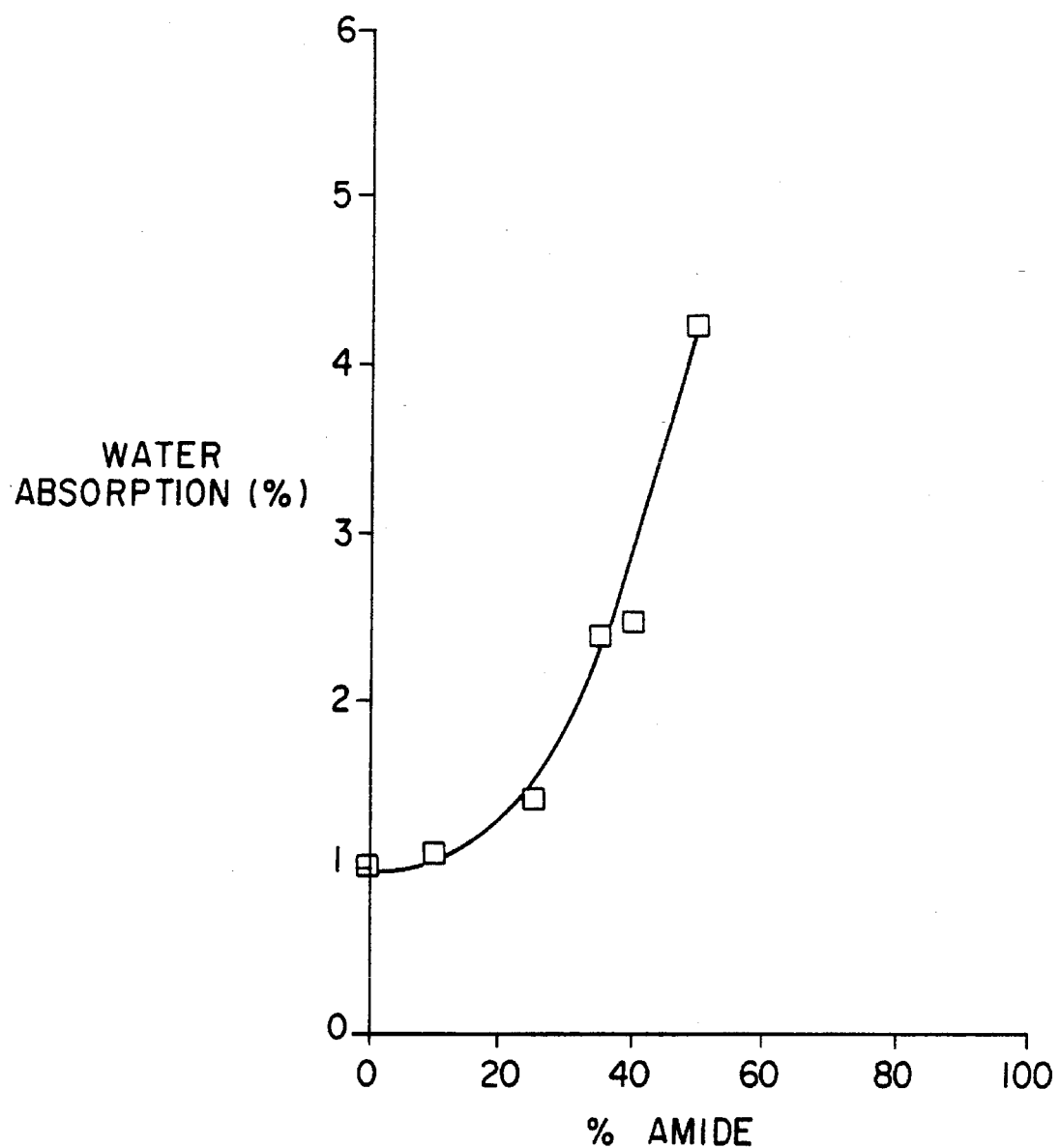
FIG. 6 shows the Water absorption at 100% RV (in boiling water, 24 hours)as a funtion of the amide content.

In this connection it is to be noted that the content of amide groups is calculated as follows: % amide= a/(a+b) *100, wherein a ;and b are defined as in the Claims.

Now follows an example of the preparation of a polyesteramide with 10 mol % of amide bonds, wherein the reaction is carried out without intermediate isolation and/or purification steps.

60 Grams of dimethylterephthalate (0.3 mol) are dissolved in 1,4-butanediol in a 250 ml glass vessel at 100° C. After addition of 15ml of a Li (OCH$_3$) solution (1.25 molar in methanol) the solution becomes clear. Then 2.7 grams of 1,4-butane-diamine (0.03 mol) dissolved in 1,4-butanediol are added dropwise over a period of 15 minutes. Total quantity of 1,4-butanediol: 87 ml (0.98 mol). After another 10 minutes the temperature is raised and is held at 120° C. for 2.5 hours, refluxing the methanol. In a short time the reaction mixture turns to be cloudy due to the formation of a suspension of the trimer: N,N'-bis(p-carbomethoxy-benzoyl)-butanediamine. The temperature is then raised to 170° C. and 1ml of a Ti (OC$_3$H$_7$)$_4$ solution (5% in N-butanol) is added. Within 3.0 minutes the trimer and the remaining dimethylterephthalate are transesterified by the 1,4-butanediol. Thereupon the temperature is gradually (15° C. per minute) raised to 250° C. and then vacuum (10–15 mm Hg)is applied for 15 minutes. Subsequently the pressure is gradually decreased to a value of 1,3 mm while maintaining the temperature at 250° C. It is believed that lowering the pressure still further would be beneficial.

The so obtained polyesteramide has an inherent viscosity (eta$_{inh}$) of 0.61; a melting point ($T_{m,2}$) of 222° C. and $T_c$ value of 193° C.

We claim:

1. A copolyester amide comprising amide units of the formula

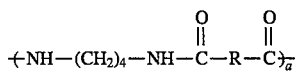

and ester units of the formula

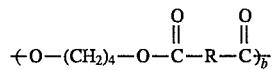

where R is a paraphenylene radical and said amide units are present in said copolyester amide at a level up to about 35 mole percent based on the total moles of amide unit and ester units in said copolyester amide wherein said mole percent amide is calculated by a/(a+b)×100; wherein a and b represent the number of repeat units of said amide and said ester, respectively.

2. The copolyester amide as claimed in claim 1, wherein the melting temperature of the copolyester amide is at least equal to the melting temperature of the corresponding polyester wherein the mole percent amide units is 0.

3. The copolyester amide as claimed in claim 1, wherein said copolyester amide consists essentially of said amide unit and said ester units.

4. The copolyester amide as claimed in claim 1, wherein the number of amide units of the formula

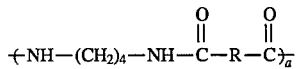

adjacent to one another is not more than 15% of the overall number of amide units.

5. The copolyester amide as claimed in claim 1, wherein not more than 10 mole percent of each component is replaced by another component.

6. The copolyester amide as claimed in claim 1, wherein said copolyester amide is made from a diester diamide, a diol, and a terephthalic acid or terephthalic acid derivative.

7. The copolyester amide as claimed in claim 6, wherein said copolyester amide is melt polymerized, solid state polymerized, or a combination of melt and solid state polymerized.

8. The copolyester amide as claimed in claim 1, wherein said amide units are present in said copolyester amide at a level up to about 25 mole percent based on the total moles of amide units and ester units in said copolyester amide

* * * * *